United States Patent
Bronstein et al.

(10) Patent No.: US 11,422,263 B2
(45) Date of Patent: *Aug. 23, 2022

(54) RANGE ESTIMATION FOR LIGHT DETECTING AND RANGING (LIDAR) SYSTEMS

(71) Applicant: Intel Corporation, Santa Clara, CA (US)

(72) Inventors: Michael Bronstein, Lugano (CH); Ron Kimmel, Haifa (IL); Alex Bronstein, Haifa (IL); Ohad Menashe, Haifa (IL); Erez Sperling, D.N. Menashe (IL); Aviad Zabatani, Kfar Vitkin (IL); Vitaly Surazhsky, Yokneam Illit Z (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/133,291

(22) Filed: Dec. 23, 2020

(65) Prior Publication Data
US 2021/0116569 A1    Apr. 22, 2021

Related U.S. Application Data

(63) Continuation of application No. 15/937,641, filed on Mar. 27, 2018, now Pat. No. 10,877,154.

(51) Int. Cl.
*G06F 11/30* (2006.01)
*G01S 17/89* (2020.01)
(Continued)

(52) U.S. Cl.
CPC .............. *G01S 17/89* (2013.01); *G01S 7/487* (2013.01); *G01S 7/4861* (2013.01); *G01S 17/10* (2013.01)

(58) Field of Classification Search
CPC ........................................................ G01S 17/89
See application file for complete search history.

(56) References Cited

U.S. PATENT DOCUMENTS

| | | | |
|---|---|---|---|
| 10,877,154 B2 * | 12/2020 | Bronstein | G01S 17/10 |
| 2005/0052635 A1 * | 3/2005 | Xie | G06F 3/0423 |
| | | | 356/3.07 |

(Continued)

OTHER PUBLICATIONS

United States Patent and Trademark Office, "Notice of Allowance," mailed in connection with U.S. Appl. No. 15/937,641, dated Aug. 25, 2020, 9 pages.

(Continued)

*Primary Examiner* — Phuong Huynh
(74) *Attorney, Agent, or Firm* — Hanley, Flight & Zimmerman, LLC

(57) ABSTRACT

Example range estimation apparatus disclosed herein include a first signal processor to estimate a signal power parameter and a noise power parameter of a LIDAR system based on first data to be output from a light capturing device of the LIDAR system. Disclosed example range estimation apparatus also include a second signal processor to generate templates corresponding to different possible propagation delays associated with second data to be output from the light capturing device, the second data associated with a modulated light beam projected by the LIDAR system, the templates generated based on the signal power parameter and the noise power parameter, and the second data to have a higher sampling rate and a lower quantization resolution than the first data. In some examples, the second signal processor is also to determine, based on the templates, an estimated propagation delay associated with the second data.

20 Claims, 8 Drawing Sheets

(51) Int. Cl.
*G01S 17/10* (2020.01)
*G01S 7/4861* (2020.01)
*G01S 7/487* (2006.01)

(56) References Cited

U.S. PATENT DOCUMENTS

2018/0348368 A1* 12/2018 Bronstein ............ G01S 7/4815
2019/0049586 A1 2/2019 Bronstein et al.

OTHER PUBLICATIONS

United States Patent and Trademark Office, "Non-final Office Action," mailed in connection with U.S. Appl. No. 15/937,641, dated May 1, 2020, 8 pages.

* cited by examiner

RANGE ESTIMATION FOR LIGHT DETECTING AND RANGING (LIDAR) SYSTEMS

RELATED APPLICATION(S)

This patent arises from a continuation of U.S. patent application Ser. No. 15/937,641, which is titled "RANGE ESTIMATION FOR LIGHT DETECTING AND RANGING (LIDAR) SYSTEMS," and which was filed on Ser. No. 15/937,641. Priority to U.S. patent application Ser. No. 15/937,641 is claimed. U.S. Patent Application No. is hereby incorporated herein by reference in its entirety.

FIELD OF THE DISCLOSURE

This disclosure relates generally to light detecting and ranging (LIDAR) and, more particularly, to range estimation for LIDAR systems.

BACKGROUND

LIDAR systems measure distances to objects by projecting a modulated laser light beam to illuminate a target object and measuring a received light beam reflected by the object. A LIDAR system estimates the propagation delay between the received reflected light beam and the projected light beam, and converts this estimated propagation delay to an estimated distance, or range estimate, to the object. As such, the accuracy of the estimated propagation delay is directly related to the accuracy of the resulting range estimate determined by the LIDAR system. Also, some LIDAR systems project the modulated light beam in a scan pattern towards the target object to enable a three-dimensional (3D) image of the object to be rendered by estimating the propagation delays for the received light beams reflected at different illuminated areas of the object, and converting these estimated propagation delays to range estimates to be rendered at corresponding pixels in the image. The quality of such a 3D image of the object is likewise directed related to the accuracies of the propagation delay estimates used to generate the range estimates.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
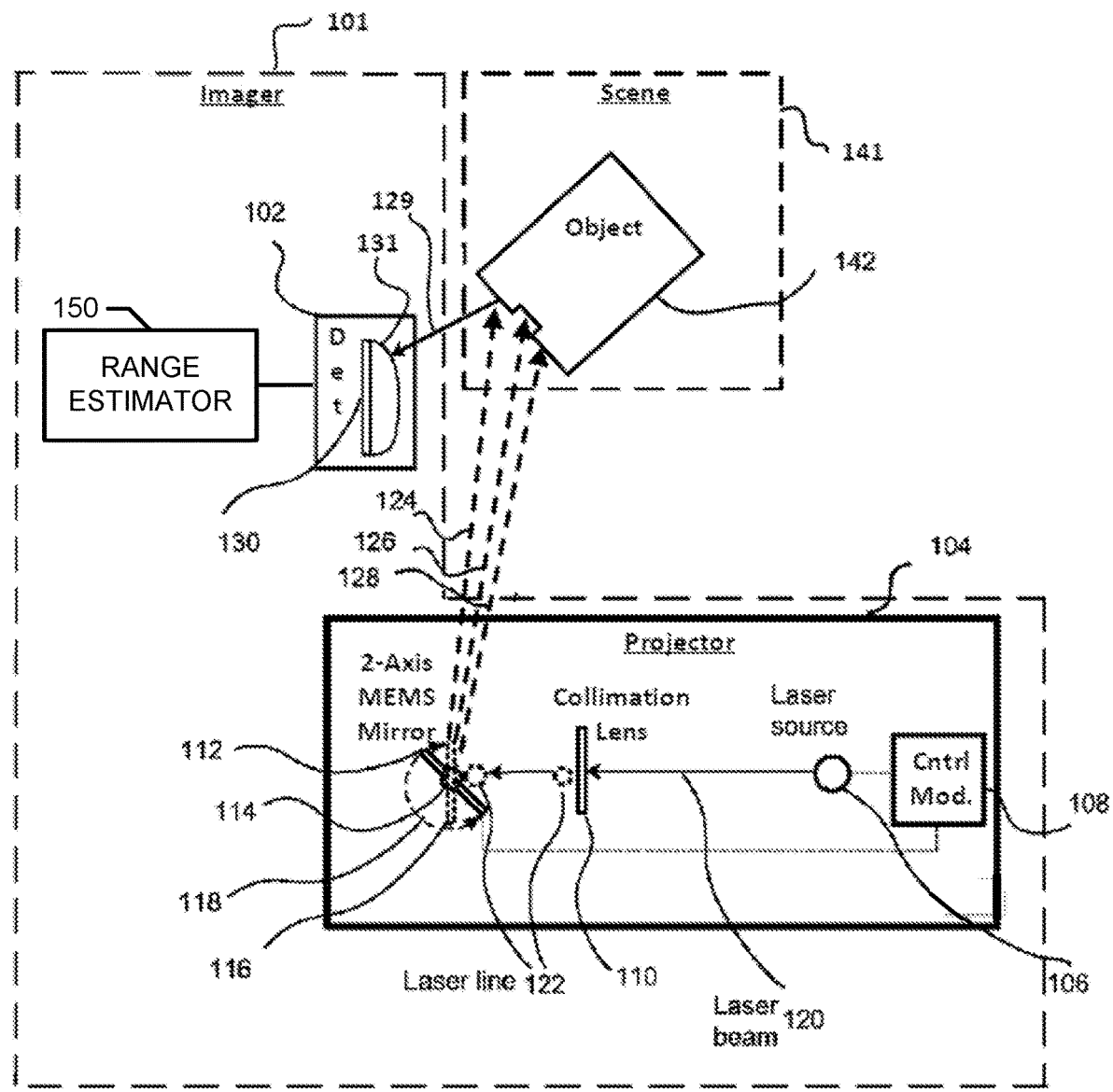
FIG. 1 is a block diagram of an example LIDAR system implementing maximum likelihood range estimation in accordance with teachings of this disclosure.

Example methods, apparatus, systems and articles of manufacture (e.g., non-transitory physical storage media) to implement maximum likelihood range estimation for LIDAR systems are disclosed. Example range estimation apparatus (e.g., range estimators) for LIDAR systems disclosed herein include a first signal processor to process first data output from a light capturing device of the LIDAR system to estimate signal and noise power parameters of the LIDAR system. Disclosed example range estimation apparatus also include a second signal processor to generate templates corresponding to different possible propagation delays associated with second data output from the light capturing device while a modulated light beam is projected by the LIDAR system, with the templates being generated based on the signal and noise power parameters. In some examples, the second data has a higher sampling rate and a lower quantization resolution than the first data. For example, the second data may be binary quantized to have one-bit resolution, whereas the first data may be quantized to have a higher resolution (e.g., 16 bits, 32 bits, etc.). The second signal processor of such disclosed example range estimation apparatus also is to cross-correlate the templates with the second data to determine an estimated propagation delay associated with the second data. The estimated propagation delay can then be converted to an estimated range to an object that reflected the modulated light beam.

Some disclosed example range estimation apparatus also include a range renderer to convert the estimated propagation delay to the estimated range to the object. In some disclosed examples, the range renderer is also to render the estimated range as a pixel value of a three-dimensional image of the object. For example, the pixel value can correspond to a scan position of the modulated light beam when the second data was output from the light capturing device.

Additionally or alternatively, in some disclosed example range estimation apparatus, the second signal processor is to generate a first one of the templates corresponding to a first one of the possible propagation delays by: (1) determining input values corresponding respectively to samples of the second data, the input values being determined based on the samples of the second data, the first one of the possible propagation delays and the signal and noise power parameters, (2) evaluating a cumulative distribution function based on the input values to determine probability values corresponding to the respective samples of the second data and (3) determining the first one of the templates based on the probability values. For example, the second signal processor can determine the first one of the templates based on ratios of the probability values.

Additionally or alternatively, in some disclosed example range estimation apparatus the first signal processor is to estimate the signal and noise power parameters by: (1) determining a first measurement based on a first portion of the first data output from the light capturing device while the modulated light beam was off, (2) determining a second measurement based on a second portion of the first data output from the light capturing device while the modulated light beam was on, (3) estimating the noise power parameter based on the first measurement and (4) estimating the signal power based on the second measurement and the noise power parameter. In some disclosed example range estimation apparatus, the second signal processor is further to determine respective estimated propagation delays corresponding to respective output data from the light capturing device obtained when the modulated light beam is projected at respective different scan positions corresponding to a scan pattern. In some such examples, the first signal processor is further to determine respective estimated noise parameters corresponding to the respective different scan positions, and determine respective estimated signal parameters corresponding to respective scan lines of the scan pattern.

These and other example methods, apparatus, systems and articles of manufacture (e.g., non-transitory physical storage media) to implement maximum likelihood range estimation for LIDAR systems are disclosed in further detail below.

As noted above, a LIDAR system estimates a propagation delay between a a projected light beam illuminating an object and a corresponding received reflected light beam from the object, and converts this estimated propagation delay to a range estimate to the object. Prior LIDAR systems estimate the propagation delay by cross-correlating a received signal corresponding to the received reflected light beam with a transmitted signal corresponding to the projected light beam. Such correlation of the received and transmitted signals can yield a good estimate of the propagation delay when the noise included in the received signal is Gaussian and, more specifically, additive white Gaussian noise. However, the noise in the received signal of a LIDAR system may not be Gaussian noise. As such, simply cross-correlating the received and transmitted signals to estimate the propagation delay, as is done in prior LIDAR systems, may not yield an estimated propagation delay that is accurate.

In contrast, LIDAR systems implementing maximum likelihood range estimation in accordance with teachings of this disclosure provide technical solutions to such technical problems associated with prior LIDAR systems. For example, maximum likelihood range estimation as disclosed herein does not assume that the noise in the received signal of the LIDAR system is Gaussian noise but, rather, accounts for multiple different noise sources that can be included in the received signal. For example, such noise sources can include, but are not limited to, ambient shot noise, signal shot noise, electronic noise, jitter, laser speckle, etc. Moreover, to support high data sampling rates, the received signal in modern LIDAR signals may undergo aggressive quantization, possibly down to single-bit, or binary, quantization, which causes the noise in the received signal to be non-Gaussian. To enable accurate range estimation under such non-Gaussian noise conditions, example range estimators implementing maximum likelihood range estimation as disclosed herein replace the transmitted signal used in the cross-correlation of prior LIDAR systems with templates constructed to provide improved accurate propagation delay estimates when the noise in the received signal is non-Gaussian. As disclosed in further detail below, the templates are constructed based on signal and noise power parameters that are estimated for the LIDAR system.

Figure 2:
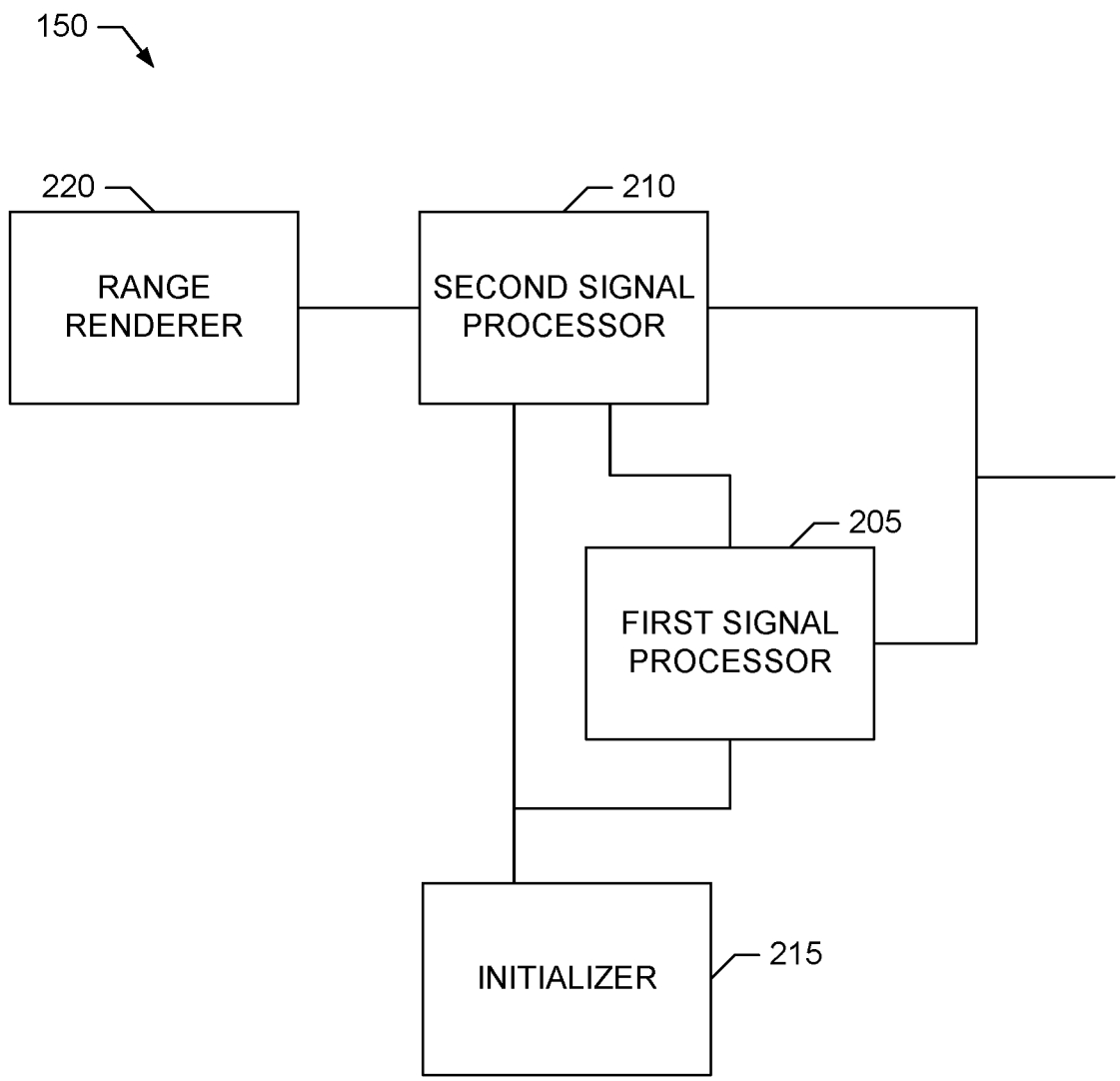
FIG. 2 is a block diagram of an example range estimator that may be used to implement maximum likelihood range estimation in the example LIDAR system of FIG. 1.

Turning to the figures, a block diagram of an example a LIDAR system 101 implementing maximum likelihood range estimation in accordance with teachings of this disclosure is illustrated in FIG. 1. In the illustrated example, the LIDAR system 101 is implemented as an imager 101 or any other device configured for light projection toward a scene 141, and for light data acquisition of light reflected back from the scene. The LIDAR system 101 of the illustrated example also includes an example range estimator 150, which performs maximum likelihood range estimation in accordance with teachings of this disclosure. An example implementation of the range estimator 150 is illustrated in FIG. 2, which is described in detail below.

In the example of FIG. 1, the LIDAR system 101 includes an example reflected light capturing device 102 (e.g., a photomultiplier, digital camera, etc.) and an example light projector unit 104 (e.g., a laser projector, a laser scanner etc.) having a number of components. In some examples, the light capturing device 102 includes an infrared (IR) avalanche photodiode, and the projector unit 104 includes an IR projector. However, maximum likelihood range estimation for LIDAR systems, as disclosed herein, is in no way limited to such example light generators, projectors or detectors, and other approaches may be used.

In the illustrated example, the light projector unit 104 includes an example light source 106, such as a laser device configured to provide an example laser beam 120, where the light source 106 may be coupled with an example control module 108. The control module 108 may be implemented as a software or hardware module, or a combination thereof. In some examples, the control module 108 may include a hardware implementation. The control module 108 may be configured to control (e.g., modulate) an optical power of the laser beam 120 provided by the laser source 106, for example, to encode a pulse of the laser beam 120 with a known or predetermined code (e.g., signature). However, maximum likelihood range estimation for LIDAR systems, as disclosed herein, is in no way limited to such example control functions, and other types of control may also be included.

The light projector unit 104 of the illustrated example also includes an example optical lens 110. The laser source 106 and the optical lens 110 may be configured so that the modulated laser beam 120 may pass through the optical lens 110. In some examples, the lens 110 may be a lens structured to focus light which passes through on to a line instead of on to a point, in contrast to a spherical lens. In some examples, the lens 110 may include one or more of a collimation lens and/or a cylindrical lens. Accordingly, in some examples, the lens 110 may be configured to transform the laser beam 120 passing through the lens 110 into a laser line 122. For better understanding of a spatial disposition of the laser line 122, note that the laser line 122 may be disposed on a plane that is perpendicular to the plane of FIG. 1. Accordingly, the laser line 122 formed from the laser beam 120 passing through the lens 110 is shown as perpendicular to the plane of FIG. 1. However, maximum likelihood range estimation for LIDAR systems, as disclosed herein, is in no way limited to such example light arrangements, and other approaches may be used. Furthermore, because the lens 110 may not be present in some examples, or may not be structured to focus light into a line, the laser beam 120 and laser beam/line 122 are used interchangeably, unless noted otherwise, to refer to the light beam output from the LIDAR system 101.

The example laser beam/line 120/122 of FIG. 1 may be received and deflected by an example mirror 112, which is tiltable and/or rotatable, of the LIDAR system 101. The mirror 112 thereby directs, during mirror tilting, the laser beam/line 120/122 in multiple laser directions or planes, such as example directions/planes indicated by reference numerals 124, 126, and 128 in FIG. 1. Because of mirror tilting and/or scanning over time, the aiming of the direction of the laser beam/line 120/122 will correspondingly change from one instance to another. Accordingly, over time, the laser projections toward an example scene 141 will form a fan-like spread of differing laser directions. A laser beam at one side of the fan will be projected in a specific direction, while a laser beam at an opposite side of the fan will be projected in a differing (e.g., unique) direction. Thus, two laser beams, such as adjacent laser beams projected at differing instances of time within the fan pattern, will have differing laser directions from each other. Further, laser beam projections at different instances of time will have mutually differing directions from one another. However, maximum likelihood range estimation for LIDAR systems, as disclosed herein, is in no way limited to such example fan-like spread of laser directions, or to use of only a single laser projection, and other approaches may be used.

In the illustrated example, the laser beam/line 120/122 is encoded with a predetermined code (e.g., via intensity modulation). Further, the mirror 112 and, thus, the laser beam/line 120/122 is scanned, such that the encoded laser beam/line 120/122 is scanned in a fan-shaped pattern into the scene 141.

In some examples, the mirror 112 may be a microelectromechanical system (MEMS) scanning mirror. In some examples, a mirror surface of the MEMS scanning mirror 112 may be made of silicon (Si), although different materials providing different properties related to scanning mirror reflection qualities may be utilized in various examples. In some examples, the mirror 112 may be a single-axis (e.g., rotating hexagonal) mirror, while in other examples the mirror 112 may be a two-axis MEMS scanning mirror or a two-mirror system. In some examples, the MEMS scanning mirror 112 may be configured to be at least partially tiltable (rotatable) around the axis 114, in order to deflect the laser beam/line 120/122 to produce light patterns projected by the mirror 112 to an example object 142 and defined by the laser directions/planes 124, 126, 128. For example, the mirror 112 may be tiltable, as shown representatively by dashed arc 118, at least from its resting position indicated by the numeral 116 to the mirror positioned as indicated by 112.

In some examples, tilting is conducted to provide a scan angle that ensures a desired dimension for the light patterns defined by the exit laser directions or planes 124, 126, 128. The axis 114 may be substantially parallel to the laser beam/line 120/122. Further, the MEMS scanning mirror 112 may be disposed within a plane that is perpendicular to the plane of FIG. 1, and may be tiltable around the axis 114, as shown. Accordingly, the laser planes 124, 126, 128 may also be substantially perpendicular to the plane of FIG. 1. In some embodiments, the control module 108 may be configured to control the tilting of the MEMS scanning mirror 112, or a rotation of a rotatable mirror.

In some examples, the projector unit 104, which is configured to project the light pattern as described above, may include a one-dimensional coded projector and the light patterns may include one-dimensional coded light patterns, e.g., the patterns that may be described by one-dimensional or linear codes. The light patterns formed by the laser planes 124, 126, 128 on a surface of the object 142 may be reflected 129 and then received by the image capturing device 102, and sensed (e.g., read) by a detector or sensor 130 of the image capturing device 102. That is, a lens 131 on the sensor 130 may capture and deliver light reflections to the sensor 130. Based on the readings of the multiple scans of the light patterns accumulated during a sensing cycle of the sensor 130, the LIDAR system 101, in some examples, renders a depth image with respect to the shape of the object 142. In the illustrated example of FIG. 1, the object 142 is located within an example scene 141 or scanning volume which is scannable by the LIDAR system 101.

In some examples, the LIDAR system 101 may further include another image capturing device, such as digital camera (not shown). In some examples, the digital camera may have a light capturing mode and/or resolution that is different than that of the light capturing device 102. For example, the digital camera may be a multi-chromatic camera, such as red, green, and blue (RGB) camera configured to capture texture images of the object 142. However, maximum likelihood range estimation for LIDAR systems, as disclosed herein, is in no way limited to such examples, and other types of cameras may be used.

Figure 8:
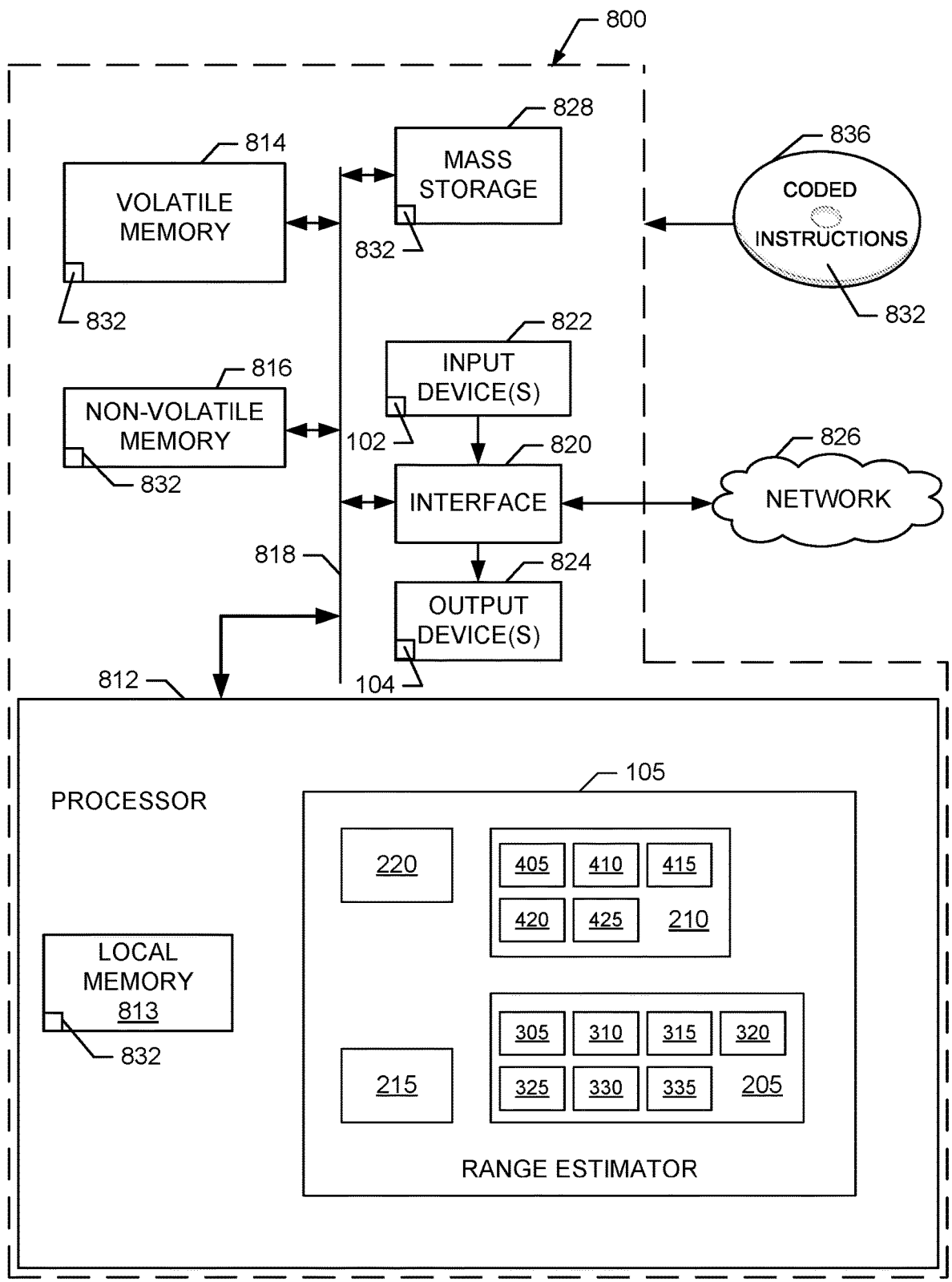
FIG. 8 is a block diagram of an example processor platform structured to execute the example computer readable instructions of FIGS. 5, 6 and/or 7 to implement the example range estimator of FIGS. 1-2, the example first signal processor of FIG. 3 and/or the example second signal processor of FIG. 4 in the example LIDAR system of FIG. 1.

In some examples, the LIDAR system 101 is implemented in a processing platform, such as the example processor platform 800 of FIG. 8. The example processor platform 800 of FIG. 8 is described in further detail below.

In operation, the projector 104 of the LIDAR system may project and scan a modulated light beam 120/122 (e.g., including one-dimensional coded light patterns) on an object, such as example object 142. The light capturing device 102 may then capture a corresponding received light beam reflected from the object 142 and convert the received light beam to a received signal, such as an electrical signal. The range estimator 150 of the illustrated example processes the received signal obtained from the light capturing device 102 to determine a range estimate to the object 142, or multiple range estimates as the modulated light beam 120/122 is scanned over the object 142.

An example implementation of the range estimator 150 of FIG. 1 is illustrated in FIG. 2. The example range estimator 150 of FIG. 2 includes an example first signal processor 205, an example second signal processor 210, an example initializer 215 and an example range renderer 220 to implement maximum likelihood range estimation in the example LIDAR system 101 of FIG. 1. The second signal processor 210 of the illustrated example estimates propagation delays between modulated light beams projected by the light projector unit 104 of the LIDAR system 101 to illuminate an object, such as the object 142, and corresponding received light beams reflected by the object and sensed by the light capturing device 102 of the LIDAR system 101. The second signal processor 210 estimates the propagation delay between a projected light beam and a corresponding received light beam by cross-correlating received data output by the light capturing device 102, which is representative of the received light beam, with templates generated based on data representative of the projected light beam, and also based on signal and noise power parameters of the LIDAR system 101. The signal and noise power parameters of the LIDAR system 101 are estimated by the first signal processor 205. The templates correspond to different possible propagation delays in a range of possible delays between the projected light beam and the corresponding received light beam. The second signal processor 210 then cross-correlates the received data representative of the received light beam with the templates to determine which possible propagation delay to select as the estimated propagation delay between the projected light beam and the corresponding received light beam. For example, the second signal processor 210 may select the possible propagation delay yielding the largest, or maximum, cross-correlation result to be the estimated propagation delay.

In the illustrated example of FIG. 2, the range renderer 220 converts the estimated propagation delay determined by the second signal processor 210 to an estimated range to the object. For example, because the estimated propagation delay corresponds to the time taken by the projected light beam to travel to the target object and the return back to the LIDAR system 101 after being reflected, the range renderer 220 may convert the estimated propagation delay to an estimated range by multiplying the estimated propagation delay by half the speed of light. In some examples, the range renderer 220 also renders the estimated range as a pixel value of a 3-D image of the object. For example, the pixel value rendered by the range renderer 220 can correspond to a scan position of the modulated light beam output by the light projector unit 104 of the LIDAR system 101 when the received data corresponding to the received light beam was output from the light capturing device 102 of the LIDAR system. By rendering different range estimates as the light projector unit 104 of the LIDAR system 101 scans the modulated light beam to illuminate the object, the range renderer 220 can render a 3-D image of the some or all of the object.

In the illustrated example of FIG. 2, the initializer 215 initializes the first signal processor 205, the second signal processor 210 and the range renderer 220 with information used by the respective elements to perform their respective operations. For example, the initializer 215 can initialize system parameters used by the first signal processor 205 and the second signal processor 210 that are representative of characteristics of the LIDAR system 101. Examples of such system parameters are described in further detail below. The initializer 215 can also initialize parameters used by the range renderer 220, such as conversion parameters (e.g., such as the speed of light) used to convert propagation delay to distance.

Figure 4:
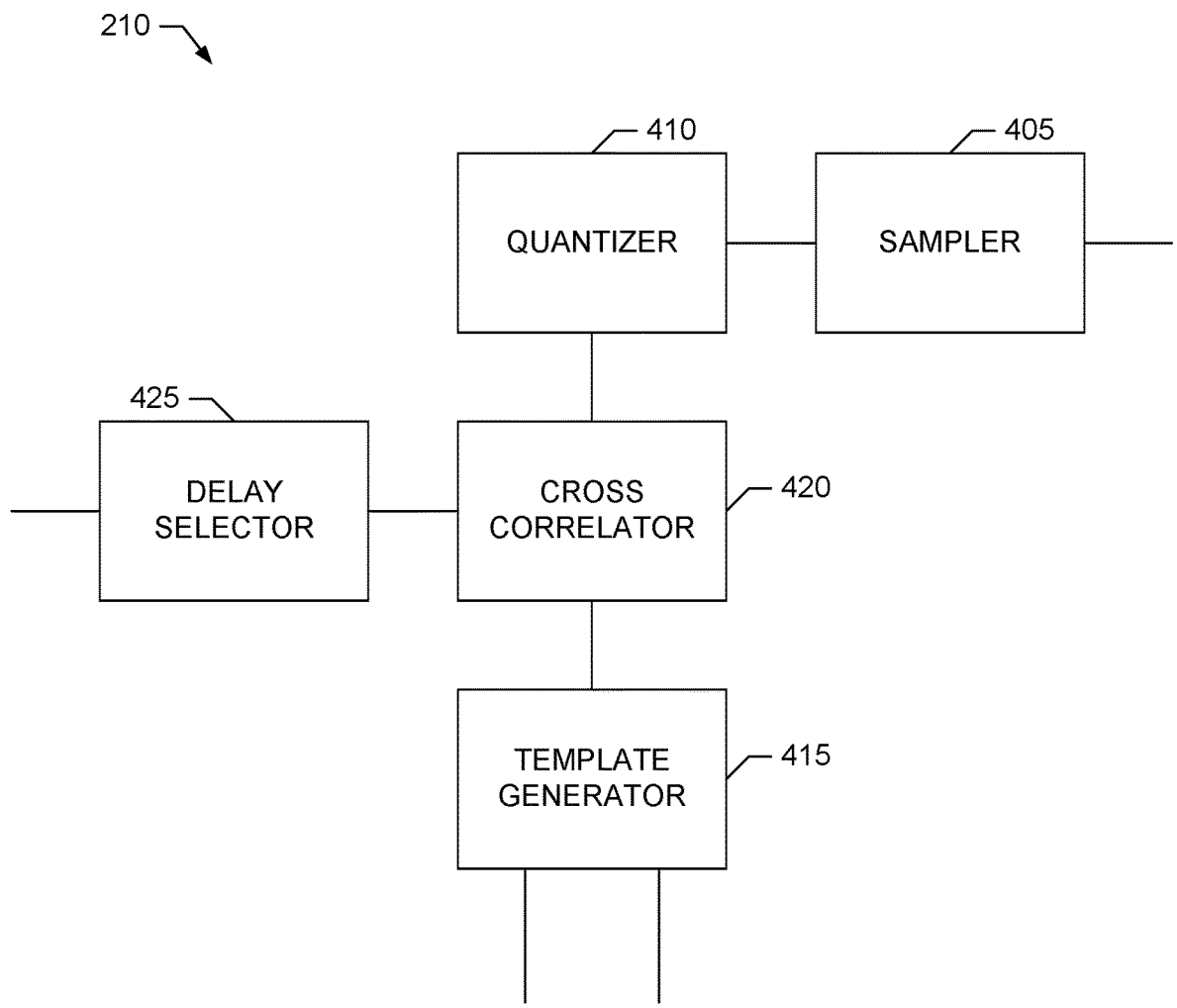
FIG. 4 is a block diagram of an example second signal processor that may be used to implement the example range estimator of FIG. 2.

As noted above, the second signal processor 210 estimates the propagation delay between a projected light beam and a corresponding received light beam by cross-correlating received data output by the light capturing device 102, which is representative of the received light beam, with templates generated based on data representative of the projected light beam, and signal and noise power parameters of the LIDAR system 101. In some examples, the second signal processor 210 generates the templates to correspond to different possible propagation delays associated with received data output from the light capturing device 102 while a modulated light beam is projected by the LIDAR system 101. As noted above, the second signal processor 210 generates the templates based on the signal and noise power parameters determined by the first signal processor 205. As disclosed in further detail below, in some examples, the second signal processor 210 generates a first one of the templates corresponding to a first one of the possible propagation delays by determining input values to be applied to a cumulative distribution function, with the input values corresponding respectively to the samples of the received data, and being determined based on the samples of the received data, the first one of the possible propagation delays and the signal and noise power parameters. The second signal processor 210 evaluates the cumulative distribution function based on the input values to determine probability values corresponding to the respective samples of the second data. The second signal processor 210 then determines the first one of the templates based on the probability values. For example, the second signal processor 210 can determine the first one of the templates based on ratios of the probability values. An example implementation of the second signal processor 210 is illustrated in FIG. 4, which is described in further detail below.

As noted above, the first signal processor 205 of the illustrated example determines the signal and noise power parameters used by the second signal processor 210 to generate its templates. For example, the first signal processor 205 processes received data output from the light capturing device 102 of the LIDAR system 101 to estimate the signal and noise power parameters of the LIDAR system 101. The first signal processor 205 estimates the signal and noise power parameters by determining a first measurement based on a first portion of the received data output from the light capturing device 102 of the LIDAR system 101 while the modulated light beam of the LIDAR system 101 was off, and determining a second measurement based on a second portion of the received data output from the light capturing device 102 while the modulated light beam of the LIDAR system was on. As disclosed in further detail below, first signal processor 205 estimates the noise power parameter based on the first measurement and estimates the signal power parameter based on the second measurement and the noise power parameter. An example implementation of the first signal processor 205 is illustrated in FIG. 3, which is described in further detail below.

In some examples, the first signal processor 205 estimates the signal power parameter and the noise power parameter at different rates based on a scan pattern used to scan the target object. For example, the LIDAR system 101 may project its modulated light beam at different positions of the target object according to a raster scan pattern. In such examples, each position of the projected light beam corresponds to a pixel of a 3-D image to be generated of the target object. Therefore, in some such examples, the second signal processor 210 determines respective estimated propagation delays corresponding to respective output data from the light capturing device 102 of the LIDAR system 101 obtained when the modulated light beam is projected at respective different scan positions corresponding to the scan pattern. In some such examples, the first signal processor 205 determines respective estimated signal power parameters corresponding to the respective different scan positions, but determines respective estimated noise power parameters corresponding to respective scan lines of the scan pattern. In other words, the first signal processor 205 may estimate the signal power parameters at a pixel rate (e.g., on a pixel-by-pixel basis), but measure the noise power parameters at a slower scan line rate (e.g., one signal parameter per scan line of the raster scan pattern). This is because, in some examples, the signal characteristics may change for each scan position of the projected light beam, whereas the noise characteristics vary more slowly across the scanned scene.

In some examples, the first signal processor 205 and the second signal processor 210 of the range estimator 105 operate on different received data obtained from the light capturing device 102 of the LIDAR system 101. For example, the second signal processor 210 of the illustrated example operates on received data from the light capturing device 102 that is sampled at a high sampling rate but with low quantization resolution, whereas the first signal processor 205 of the illustrated example operates on received data from the light capturing device 102 that is sampled at a low sampling rate but with high quantization resolution. In some examples, the received data from the light capturing device 102 that is operated on by the second signal processor 210 is sampled at a high sampling rate on the order of tens of gigahertz (GHz) (e.g., 10 to 100 GHz), but undergoes severe quantization to make the received data bit range manageable. For example, the received data operated on by the second signal processor 210 may undergo binary quantization to yield received data that has 1-bit resolution (e.g., values of 0 or 1). In contrast, in some examples, the received data from the light capturing device 102 that is operated on by the first signal processor 205 is sampled at a low sampling rate on the order of ten to 100 times lower than the sampling rate of the received data operated on by the second signal processor 210, but undergoes less quantization to yield high resolution received data. For example, the received data operated on by the first signal processor 205 may be sampled at a low data rate on the order of 100 kilohertz (kHz) to 1 GHz (or single digit GHz), but be quantized to have high resolution (e.g., 16-bit resolution, 32-bit resolution) such that the received data can be approximated as having substantially continuous data values, rather than discrete data values.

Figure 3:
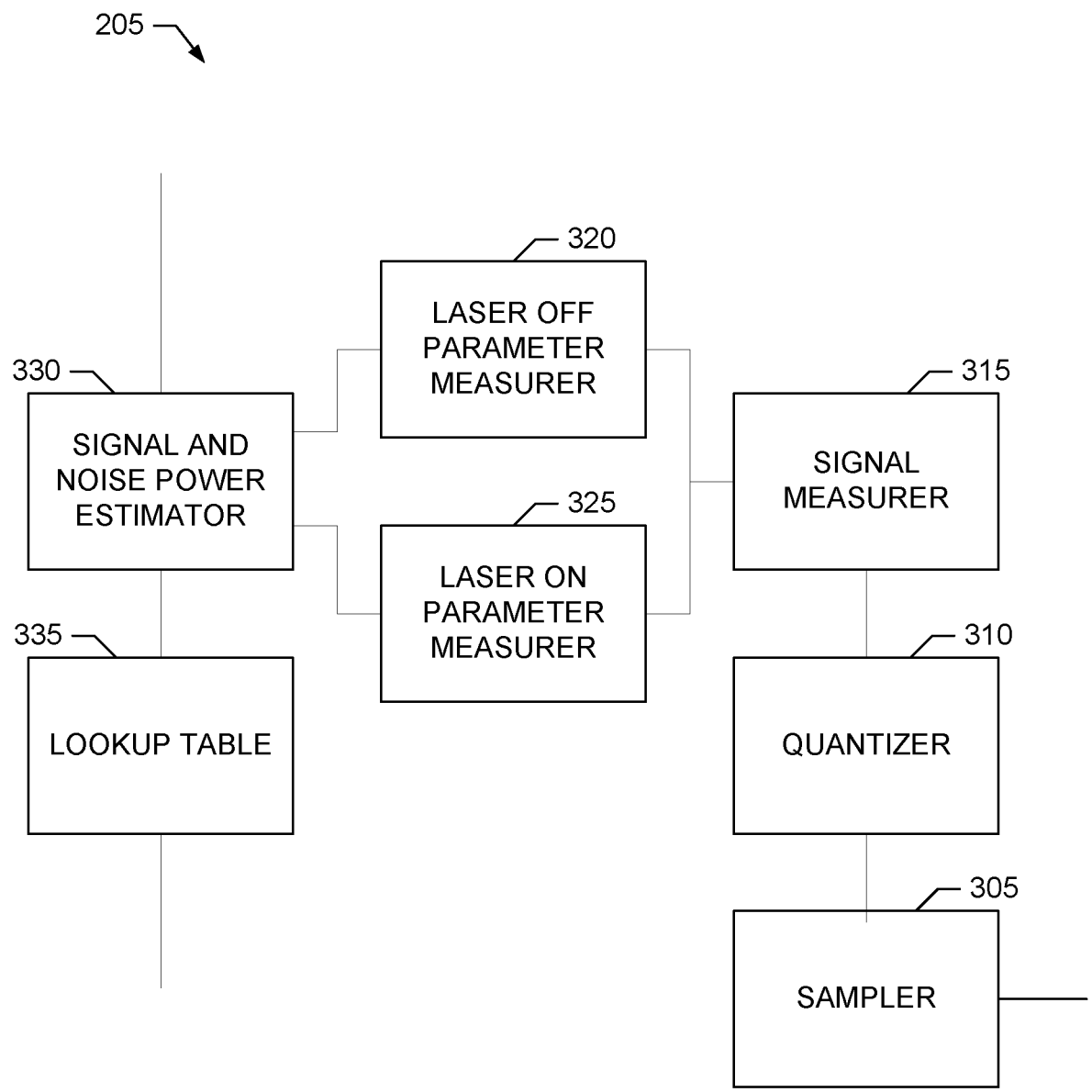
FIG. 3 is a block diagram of an example first signal processor that may be used to implement the example range estimator of FIG. 2.

Example implementations of the first signal processor 205 and the second signal processor 210 of the range estimator 105 of FIG. 2 are illustrated in FIGS. 3 and 4, respectively. These example implementations are described from the perspective of the range estimator 105 being implemented in an intensity-coded continuous wave LIDAR range measurement system 101. As described above, the LIDAR system includes a light projector unit 104 that projects a modulated laser beam transmitting intensity at a pulse frequency and a beam steering mechanism 112 (e.g., a MEMS mirror 112) to point the beam in a given direction. The reflected light is collected by a light capturing device 102, also referred to as a detector 102, to produce the measured received signal, such as a received electrical signal, which corresponds to the transmitted signal (e.g., electrical signal) used to generate the projected modulated laser beam, but with degradation resulting from noise and other characteristics of the LIDAR system 101, and an unknown propagation delay (which is also referred to as a phase shift). The unknown propagation delay is proportional to the distance, or range, to be estimated to the target object in the direction at which the modulated laser beam is projected.

In some examples, the first signal processor 205 and the second signal processor 210 of the range estimator 105 are operated to solve the problem of rendering a range profile of a target object over the different beam directions at which the modulated laser beam is projected. As noted above, a classical approach to solve the above problem is to calculate a cross-correlation function between the received and the transmitted signals. Typically, when the transmitted code of modulated laser beam is periodic, the correlation is performed over an integer number of the periods of the transmitted code. However, as also noted above, a disadvantage of the classical cross-correlation solution is that it does not accurately take into account the sources of noise in the LIDAR system 101, such as the non-stationary shot noise. As the result, the classical, maximum correlation estimation solutions can be biased.

In contrast with such classical solutions, the first signal processor 205 and the second signal processor 210 of the range estimator 105 are based on a detailed noise analysis of the LIDAR system 101 and a maximum likelihood (ML) range estimator 105 derived from the analysis. In examples in which the second signal processor 210 operates on received data having one-bit quantization, the ML estimator 105 implemented by the first signal processor 205 and the second signal processor 210 is structured as a form of cross-correlation with specially designed templates dependent on signal and noise power parameters estimated for the LIDAR system 101.

With the foregoing in mind, the example implementation of the second signal processor 210 illustrated in FIG. 4 can be derived as follows. Let t denote the continuous time variable and $x(t) \in [0,1]$ with direct current (DC) value $\bar{x}$ represent the waveform of the transmitted, modulated signal that is low-pass filtered by the end-to-end electronics and optics response function of the light projector unit 104 of the LIDAR system 101. After projection by the light projector unit 104 and reflection by the target object, the light capturing device 102 of the LIDAR system 101 measures a corresponding received signal. The measured received signal, $R_n$, which undergoes amplification by a factor $\gamma a$, where a is an amplitude gain and $\gamma$ is a the optical-to-electrical conversion gain of the light capturing device 102, DC subtraction and 1-bit sampling at a rate of $T=1/f_s$, that is obtained by the second signal processor 210 from the light capturing device 102 of the LIDAR system 101 is given by Equation 1, which is:

$$R_n = \tfrac{1}{2}\mathrm{sign}(\gamma a(x(nT-\tau)-\bar{x})+U_n+\tfrac{1}{2} \quad \text{Equation 1}$$

In Equation 1, $\tau$ represents the unknown propagation delay for the reflected signal to be received by the light capturing device 102, and which is to be estimated by the second signal processor 210. In Equation 1, sign( ) is a function that returns the sign of the input argument, and $U_n$ is a zero-mean, uncorrelated Gaussian noise process with time-varying variance given by Equation 2, which is:

$$\sigma_n^2 = \sigma^2 + \gamma^2 a x(nT-\tau) + \gamma^2 a^2(\dot{x}(nT-\tau)\sigma_j^2 + x(nT-\tau)\sigma_s^2 + \sigma_m^2) \quad \text{Equation 2}$$

The term $\sigma^2$ in Equation 2 represents the ambient shot noise, dark current and electronic noise of the LIDAR system 101. The term $\gamma^2 ax(nT-\tau)$ in Equation 2 represents the signal shot noise of the LIDAR system 101. The term $\gamma^2 a^2 \dot{x}(nT-\tau)\sigma_j^2$ in Equation 2 represents a first-order approximation of the jitter in the LIDAR system 101. The term $\gamma^2 a^2 x(nT-\tau) \sigma_s^2$ in Equation 2 represents the laser speckle and relative intensity noise in the LIDAR system 101. The term $\gamma^2 a^2 \sigma_m^2$ in Equation 2 accounts for any other modelling inaccuracies in the LIDAR system 101.

Referring to Equation 2, the transmitted signal x is known, and the conversion gain $\gamma$, the $\sigma_j^2$ term of the jitter, the $\sigma_s^2$ term of the laser speckle and relative intensity noise, and the $\sigma_m^2$ of the modelling inaccuracies can be measured in a laboratory or other controlled environment, determined from design specification of the LIDAR system 101, or otherwise determined before the LIDAR system 101 is put into operation. As such, the values of the conversion gain $\gamma$, the $\sigma_j^2$ term of the jitter, the $\sigma_s^2$ term of the laser speckle and relative intensity noise, and the $\sigma_m^2$ term of the modelling inaccuracies are examples of initialization parameters that may be maintained by the initializer 215 of the range estimator 150 and used to initialize the second signal processor 210. However, the amplitude a and the ambient noise $\sigma^2$ are unknown and estimated by the first signal processor 205, as disclosed in further detail below.

Given Equation 1 and Equation 2, the measured received signal, $R_n$, operated by the second signal processor 210 can be modeled as a random variable having a Bernoulli distribution with a probability value given by Equation 3, which is:

$$p_n(\tau) = P(R_n = 1 \mid \tau) = \Phi\left(\frac{\gamma a(x(nT-\tau)-\bar{x})}{\sigma_n}\right) \quad \text{Equation 3}$$

-continued $$= \Phi\left(\frac{\gamma a(x(nT-\tau)-\bar{x})}{\sqrt{\sigma^2 + \gamma^2 ax(nT-\tau) + \gamma^2 a^2(\dot{x}(nT-\tau)\sigma_j^2 + x(nT-\tau)\sigma_n^2 + \sigma_m^2)}}\right)$$

The probability value term $p_n(\tau)$ in Equation 3 represents the probability that the measured received signal, $R_n$, has a value of 1 for a given value of the propagation delay $\tau$. The function $\Phi(\ )$ the Gaussian error function.

Based on Equation 3, it can be shown that the log-likelihood of an observed realization, or value, $r_n$ of the measured received signal, $R_n$, for a given value of the propagation delay $\tau$ can be represented by Equation 4, which is:

$$l(r_n|\tau) = r_n \log p_n(\tau) + (1-r_n)\log(1-p_n(\tau)) = r_n a_n(\tau) + b_n(\tau) \quad \text{Equation 4}$$

In Equation 4, the term $a_n(\tau)$ is the template term given by Equation 5, which is:

$$a_n(\tau) = \log\left(\frac{p_n(\tau)}{1-p_n(\tau)}\right) \quad \text{Equation 5}$$

In Equation 4, the term $b_n(\tau)$ is the affine term given by Equation 6, which is:

$$b_n(\tau) = -\log(1-p_n(\tau)) \quad \text{Equation 6}$$

Based on Equation 4 through Equation 6, the total log-likelihood of observing N measurements $r_0, \ldots, r_{N-1}$ of the measured received signal, $R_n$, for a given value of the propagation delay $\tau$ can be represented by Equation 7, which is:

$$L(r_0, \ldots, r_{N-1} | \tau) = \sum_{n=0}^{N-1} (r_n a_n(\tau) + b_n(\tau)) \quad \text{Equation 7}$$

Assuming that the propagation delay is a multiple of the sampling period (e.g., $\tau=mT$), it can be shown that $a_n(\tau) = a_{n-m}(0) = a_{n-n}$ and, similarly, $b_n(\tau) = b_{n-m}(0) = b_{n-m}$. Under such an assumption, the total log-likelihood of Equation 7 can be simplified to Equation 8, which is:

$$L(r_0, \ldots, r_{N-1} | m) = \sum_{n=0}^{N-1} (r_n a_{n-m} + b_{n-m}) \quad \text{Equation 8}$$

Furthermore, if the template $a_n(\tau)$ is cyclic and the number of received samples N operated on for a given projected light beam direction is periodic, then the affine term ($\sum_{n=0}^{N-1} b_{n-m}$) of Equation 8 becomes a constant that can be dropped from the equation.

For a given set of N measurements $r_0, \ldots, r_{N-1}$ of the measured received signal, $R_n$, the second signal processor 210 of the illustrated example evaluates the log-likehood equations of Equation 7 or Equation 8 for a set of possible propagation delays (e.g., $\tau=\{\tau_p\}$ for Equation 7 or $m=\{m_p\}$ for Equation 8) and selects the estimated possible propagation delay that maximizes the equation to be the estimated propagation delay for the given set of received signal observations. The estimated propagation delay can then be converted to a range estimate for the given projected light beam direction by, for example, multiplying the estimated propagation delay c/2, where c represents the speed of light. As shown in Equation 7 and Equation 8, the ML propagation delay estimate and, hence, the ML range estimate determined by the second signal processor 210 has the form of cross-correlation. However, unlike the cross-correlation of the received signal with the transmitted signal implemented by prior LIDAR systems, the cross-correlation in Equation 7 and Equation 8 is a cross-correlation between the received signal and a set of template $a_n(\tau)$ or $a_{n-m}$. The templates $a_n(\tau)$ or $a_{n-m}$ take into account the noise model of Equation 2, which can yield unbiased estimates of the propagation delay even at low signal-to-noise ratios.

With the foregoing in mind, turning to FIG. 4, the example second signal processor 210 illustrated therein includes an example sampler 405, an example quantizer 410, an example template generator 415, an example cross-correlator 420 and an example delay selector 425. The example sampler 405 samples the received data output from the reflected light capturing device 102 of the LIDAR system 101 at a high sampling rate (e.g., on the order of 10 to 100 GHz, or some other value). The example quantizer 410 quantizes the sampled received data to have low resolution, such as binary (1-bit) resolution. The example template generator 415 generates the templates $a_n(\tau)$ or $a_{n-m}$ for the set of possible propagation delays $\tau=\{\tau_p\}$ or in $=\{m_p\}$ based on Equation 3 and Equation 5 provided above. For example, the template generator 415 determines the input values of function $\Phi(\ )$ of Equation 3 for different ones of the possible propagation delays $\tau=\{\tau_p\}$ or $m=\{m_p\}$ to determine the probability values for the different ones of the possible propagation delays $\tau=\{\tau_p\}$ or $m=\{m_p\}$, and forms ratios of the probability values for the different ones of the possible propagation delays according to Equation 5 to determine the templates. To determine the input values of the function $\Phi(\ )$ of Equation 3, the template generator 415 can be initialized by the initializer 215 with the values of the conversion gain $\gamma$, the $\sigma_j^2$ term of the jitter, the a term of the laser speckle and relative intensity noise, and the $\sigma_m^2$ term of the modelling inaccuracies, and can receive the signal parameter a and the noise parameter $\sigma^2$ of the LIDAR system signal and noise power parameters from the first signal processor 205. Because the transmitted signal x(t) and its DC value x are known, the template generator 415 is able to use the initialized parameters from the initializer 215 and the signal and noise power parameters from the first signal processor 205 to determine the input values of function $\Phi(\ )$ of Equation 3 for different ones of the possible propagation delays $\tau=\{\tau_p\}$ or $m=\{m_p\}$.

The cross-correlator 420 of the second signal processor 210 implements the cross-correlation expression of Equation 7 and Equation 8 to cross-correlate the received signal data $r_0, \ldots, r_{N-1}$, which is output by the light capturing device 102 of the LIDAR system 101 and sampled and quantized by the sample 405 and quantizer 410, with the templates $a_n(\tau)$ or $a_{n-m}$, for the set of possible propagation delays $\tau=\{\tau_p\}$ or $m=\{m_p\}$, which are determined by the template generator 415, as described above. The delay selector 425 selects one of the possible propagation delays based on the cross-correlation evaluations made by the cross-correlator 420 to be the estimated propagation delay associated with the received data being processed. For example, the delay selector 425 may select the possible propagation delay that yields the maximum cross-correlation value output from the cross-correlator 420 to be the estimated propagation delay associated with the received data being processed.

Turning to FIG. 3, the example implementation of the first signal processor 205 illustrated therein can be derived as follows. The electrical signal X(t) formed by the light capturing device 102, such as an avalanche photo diode, of the LIDAR system 101 can be modeled as a Poisson random variable with the rate $\gamma(\lambda_A+\lambda_L)$, where $\gamma$ is the conversion gain described above. The terms $\lambda_A$ and $\lambda_L$ characterize the optical signal detected by the light capturing device 102, which includes an ambient portion represented by $\lambda_A$, which is constant, and a laser illumination portion represented by $\lambda_L$ (t)=ax(t), where x(t) represents the intensity modulated transmitted signal, and a is the received signal amplitude. The received signal X(t) can be approximated by a Gaussian random variable given by Equation 9, which is:

$$X(t)=\gamma\lambda_A+\gamma ax(t)+N(t) \quad \text{Equation 9}$$

In Equation 9, N(t) is a non-stationary white zero-mean Gaussian process with variance $\sigma_n^2=\sigma_A^2+\sigma_E^2+\gamma ax(t)$, with $\sigma_A=\gamma\lambda_A$ and $\sigma_E$ denoting the power of the trans-impedance amplifier of the light capturing device 102. In the first signal processor 205, the output electrical signal X(t) from the light capturing device 102 further undergoes linear time-invariant low-pass filtering with an impulse response h(t), producing an output signal given by Equation 10, which is:

$$Y(t)=(X*h)(t)\approx\gamma a(x(t)-\bar{x})+N(t) \quad \text{Equation 10}$$

In Equation 10, the term x denotes the received signal's DC level. The first signal processor 205 then generates a measured signal that is the absolute value of the low-pass filtered signal Y(t) of Equation 10, and integrates that signal over an interval $T_x$ that is approximately the period of the modulated transmitted signal X(t). Assuming that any coloring of the spectrum of the noise N(t) can be ignored, and the low-pass filtering also removes the DC level, the resulting measured signal is given by Equation 11, which is:

$$Z(t)=\frac{1}{T}\int_{-T}^{0}|Y(t+\tau)|d\tau=\frac{1}{T}\int_{0}^{T}|\gamma a(x(t)-\bar{x})+N(t)|dt \quad \text{Equation 11}$$

The first signal processor 205 processes the received signal of Equation 11 to determine the signal parameter a and the noise parameter $\sigma^2$ of the LIDAR system signal and noise power parameters. For example, when the laser of the light projector unit 104 is off and, thus, a=0, the measurement determined by the first signal processor 205 according to Equation 11 is given by Equation 12, which is:

$$M_0=\frac{1}{T}\int_0^T |N_0(t)|dt \quad \text{Equation 12}$$

In Equation 12, the term $N_0$ denotes the noise signal without the contribution of the signal shot noise. Because $|N_0(t)|$ is half-normally distributed (which is a normal distribution that is folded about the vertical axis), by the law of large numbers, the measurement of Equation 12 can be approximated by Equation 13, which is:

$$M_0 \approx E|N_0(t)|=\sqrt{\frac{2}{\pi}}\sigma \quad \text{Equation 13}$$

In Equation 13, $\sigma^2=\sigma_A^2+\sigma_E^2$, and E[ ] represents the expected value operation.

When the laser of the light projector unit 104 is on and, thus, a>0, and assuming a 50% duty cycle, the received signal oscillates between $-\gamma a\bar{x}$ plus noise half of the time, and $+\gamma a\bar{x}$ plus stronger noise the other half of the time. Thus, the measurement determined by the first signal processor 205 according to Equation 11 when the laser is on is given by Equation 14, which is:

$$M_1=\frac{1}{2T}\int_0^T |N_0(t)-\gamma a\bar{x}|dt+\frac{1}{2T}\int_0^T |N_1(t)+\gamma a\bar{x}|dt \quad \text{Equation 14}$$

In Equation 14, the term $N_1(t)$ denotes the noise signal with the contribution of the signal shot noise. Again, by the law of large numbers, the measurement of Equation 14 can be approximated by Equation 15, which is:

$$M_1=½E|N_0(t)-\gamma a\bar{x}|+½E|N_1(t)+\gamma a\bar{x}| \quad \text{Equation 15}$$

In Equation 15, the two noise signals are not zero mean, but have folded normal distributions rather than half normal distributions. Accordingly, the expected value in Equation 15 is given by Equation 16, which is:

$$\begin{aligned}M_1 &= \frac{1}{2}\left[\sigma\sqrt{\frac{2}{\pi}}e^{-\frac{1}{2}\left(\frac{\gamma a\bar{x}}{\sigma}\right)^2}-\gamma a\bar{x}\left(1-2\Phi\left(\frac{\gamma a\bar{x}}{\sigma}\right)\right)+\right.\\ &\quad \sqrt{\sigma^2+\gamma^2 a}\sqrt{\frac{2}{\pi}}e^{-\frac{1}{2}\frac{(\gamma a\bar{x})^2}{\sigma^2+\gamma^2 a}}+\\ &\quad \left.\gamma a\bar{x}\left(1-2\Phi\left(-\frac{\gamma a\bar{x}}{\sqrt{\sigma^2+\gamma^2 a}}\right)\right)\right]\\ &= \frac{1}{2}\sqrt{\frac{2}{\pi}}\left(\sigma e^{-\frac{1}{2}\left(\frac{\gamma a\bar{x}}{\sigma}\right)^2}+\sqrt{\sigma^2+\gamma^2 a}\, e^{-\frac{1}{2}\frac{(\gamma a\bar{x})^2}{\sigma^2+\gamma^2 a}}\right)+\\ &\quad \gamma a\bar{x}\left(\Phi\left(\frac{\gamma a\bar{x}}{\sigma}\right)-\Phi\left(-\frac{\gamma a\bar{x}}{\sqrt{\sigma^2+\gamma^2 a}}\right)\right)\\ &= \frac{1}{\sqrt{2\pi}}\left(\sigma e^{-\frac{\gamma a\bar{x}^2}{8\pi^2}}+\sqrt{\sigma^2+\gamma^2 a}\, e^{-\frac{(\gamma a\bar{x})^2}{8(\sigma^2+\gamma^2 a)}}\right)+\\ &\quad \frac{\gamma a}{2}\left(\Phi\left(\frac{\gamma a}{2\sigma}\right)-\Phi\left(-\frac{\gamma a}{2\sqrt{\sigma^2+\gamma^2 a}}\right)\right)\end{aligned}$$

In Equation 16, the DC offset was set to $\bar{x}=½$.

From Equation 13, the first signal processor 205 is able to estimate the noise parameter $\sigma$ from the measurement $M_0$. Then, using the estimated noise parameter and the conversion gain, from Equation 16, the first signal processor 205 is able to estimate the signal parameter a from the measurement $M_1$. In this way, the first signal processor 205 determines the signal parameter a and the noise parameter $\sigma$ of the signal and noise power parameters for the LIDAR system 101.

With the foregoing in mind, turning to FIG. 3, the example first signal processor 205 illustrated therein includes an example sampler 305, an example quantizer 310, an example signal measurer 315, an example laser off parameter measurer 320, an example laser on parameter measurer 325, an example signal and noise power estimator 330 and an example lookup table 335. The example sampler 305 samples the received data output from the reflected light capturing device 102 of the LIDAR system 101 at a lower sampling rate (e.g., on the order of 100 kHz to 1 GHz, or some other value) than the sampling rate of the received data operated on by the second signal processor 210. The example quantizer 310 quantizes the sampled received data to have high resolution (e.g., 16-bit resolution, 32-bit resolution, etc.) The signal measurer 315 measures the received data from the sampler 305 and quantizer 310 according to Equation 10 to produce the measured received signal Y(t). Then, while the project laser beam of the LIDAR system 101 is off, the laser off parameter measurer 320 processes the measured received signal Y(t) according to Equation 11 to yield the laser off measured parameter $M_0$ of Equation 12 and Equation 13. Similarly, while the project laser beam of the LIDAR system 101 is on, the laser on parameter measurer 325 processes the measured received signal Y(t) according to Equation 11 to yield the laser on measured parameter $M_1$ of Equation 14 through Equation 16.

Given the laser off measured parameter $M_0$ and the laser on measured parameter $M_1$, the signal and noise power estimator 330 estimates the signal and noise power parameters of the LIDAR system 101. For example, the signal and noise power estimator 330 determines the noise parameter σ of the signal and noise power parameters from the measurement $M_0$ according to Equation 13, and determines the signal power a of the signal and noise power parameters from the measurement $M_1$, the estimated noise parameter σ and the conversion gain γ. In some examples, the lookup table 335 provides precomputed mappings of the measurement $M_0$ and the measurement $M_1$ to the signal parameter a and the noise parameter σ. As described above, in some examples, the signal and noise power estimator 330 estimates noise parameters σ for each of the different scan positions/directions at which the LIDAR system 101 projects its modulated light beam to measure a target object, but estimates signal parameters a less frequently, such as for each scan line of the scan pattern. In other words, the signal and noise power estimator 330 may estimate the noise parameters σ at a pixel rate (e.g., on a pixel-by-pixel basis), but measure the signal parameters a at a slower scan line rate (e.g., one signal parameter per scan line of the raster scan pattern).

While example manners of implementing the example range estimator 150 is illustrated in FIGS. 1-4, one or more of the elements, processes and/or devices illustrated in FIGS. 1-4 may be combined, divided, re-arranged, omitted, eliminated and/or implemented in any other way. Further, the example first signal processor 205, the example second signal processor 210, the example initializer 215, the example range renderer 220, the example sampler 305, the example quantizer 310, the example signal measurer 315, the example laser off parameter measurer 320, the example laser on parameter measurer 325, the example signal and noise power estimator 330, the example lookup table 335, the example sampler 405, the example quantizer 410, the example template generator 415, the example cross-correlator 420, the example delay selector 425 and/or, more generally, the example range estimator 150 of FIGS. 1-4 may be implemented by hardware, software, firmware and/or any combination of hardware, software and/or firmware. Thus, for example, any of the example first signal processor 205, the example second signal processor 210, the example initializer 215, the example range renderer 220, the example sampler 305, the example quantizer 310, the example signal measurer 315, the example laser off parameter measurer 320, the example laser on parameter measurer 325, the example signal and noise power estimator 330, the example lookup table 335, the example sampler 405, the example quantizer 410, the example template generator 415, the example cross-correlator 420, the example delay selector 425 and/or, more generally, the example range estimator 150 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example range estimator 150, the example first signal processor 205, the example second signal processor 210, the example initializer 215, the example range renderer 220, the example sampler 305, the example quantizer 310, the example signal measurer 315, the example laser off parameter measurer 320, the example laser on parameter measurer 325, the example signal and noise power estimator 330, the example lookup table 335, the example sampler 405, the example quantizer 410, the example template generator 415, the example cross-correlator 420 and/or the example delay selector 425 is/are hereby expressly defined to include a non-transitory computer readable storage device or storage disk such as a memory, a digital versatile disk (DVD), a compact disk (CD), a Blu-ray disk, etc. including the software and/or firmware. Further still, the example range estimator 150 may include one or more elements, processes and/or devices in addition to, or instead of, those illustrated in FIGS. 1-4, and/or may include more than one of any or all of the illustrated elements, processes and devices.

Figure 5:
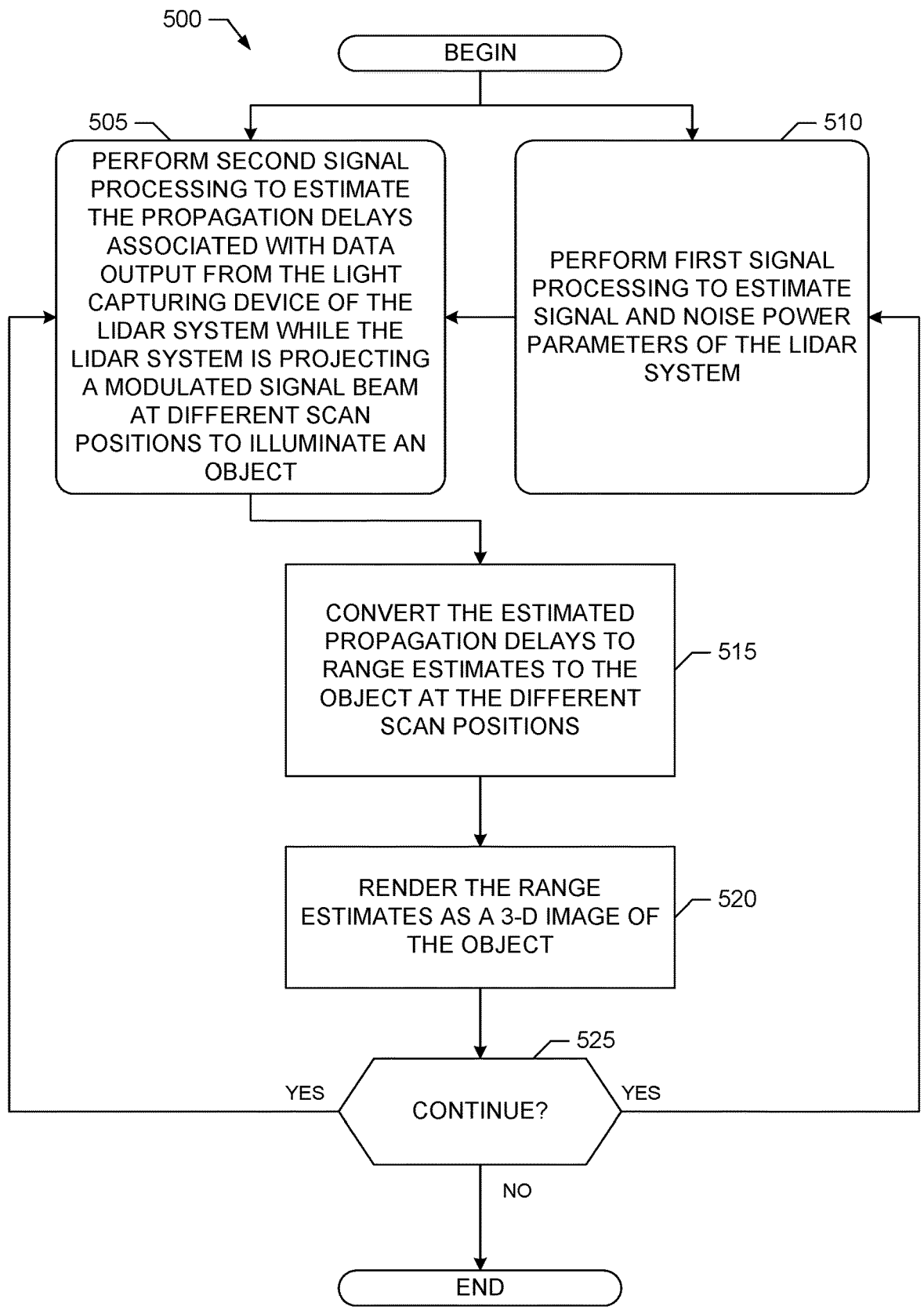
FIGS. 5-7 are flowcharts representative of example computer readable instructions that may be executed to implement the example range estimator of FIGS. 1-2, the example first signal processor of FIG. 3 and/or the example second signal processor of FIG. 4.
Figure 6:
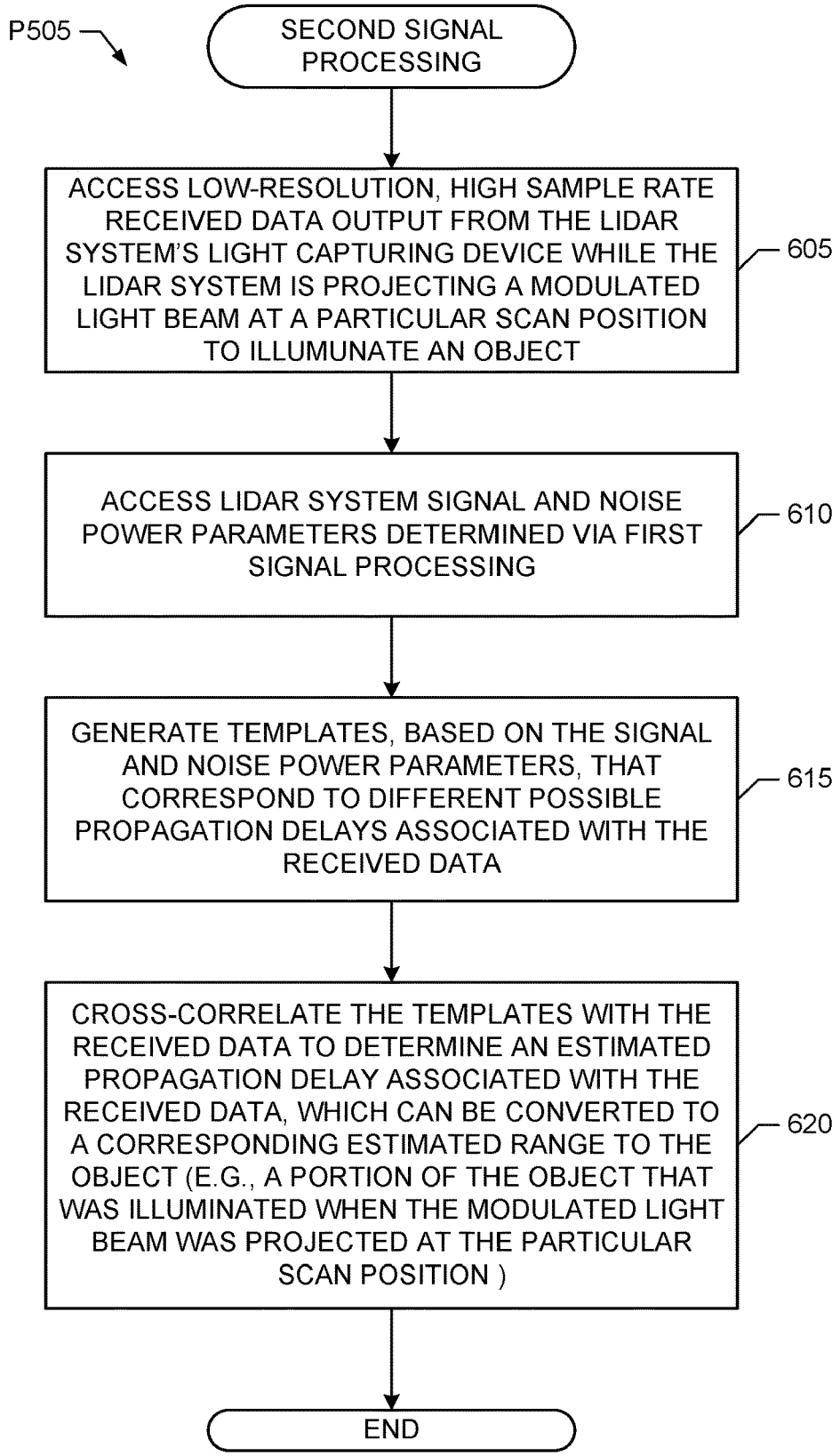
Figure 7:
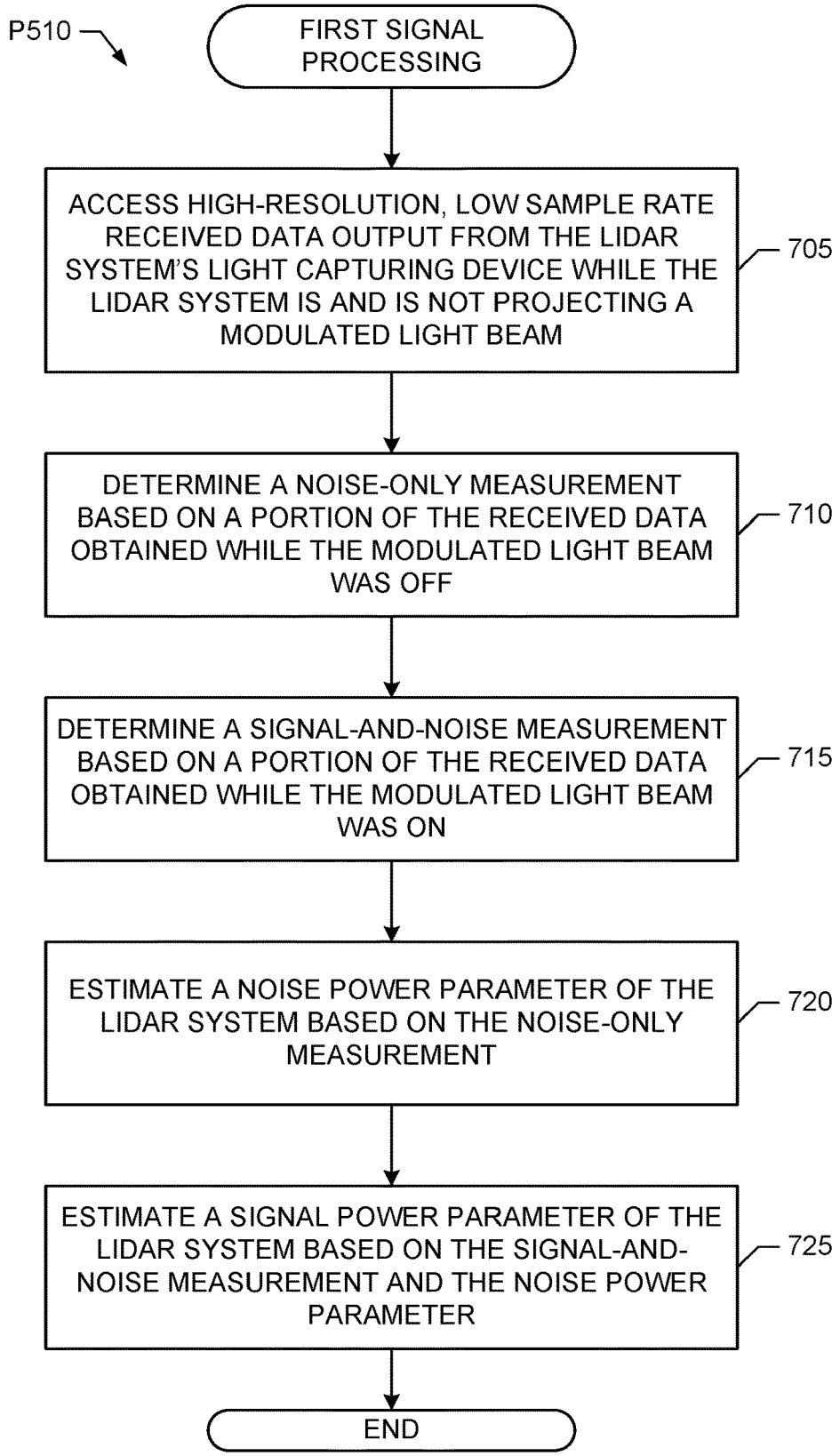

Flowcharts representative of example machine readable instructions for implementing the example range estimator 150, the example first signal processor 205, the example second signal processor 210, the example initializer 215, the example range renderer 220, the example sampler 305, the example quantizer 310, the example signal measurer 315, the example laser off parameter measurer 320, the example laser on parameter measurer 325, the example signal and noise power estimator 330, the example lookup table 335, the example sampler 405, the example quantizer 410, the example template generator 415, the example cross-correlator 420 and/or the example delay selector 425 are shown in FIGS. 5-7. In these examples, the machine readable instructions comprise one or more programs for execution by a processor, such as the processor 812 shown in the example processor platform 800 discussed below in connection with FIG. 8. The one or more programs, or portion(s) thereof, may be embodied in software stored on one or more non-transitory computer readable storage media such as a CD-ROM, a floppy disk, a hard drive, a digital versatile disk (DVD), a Blu-Ray Disk™, or a memory associated with the processor 812, but the entire program or programs and/or parts thereof could alternatively be executed by a device other than the processor 812 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 5-7, many other methods of implementing the example range estimator 150, the example first signal processor 205, the example second signal processor 210, the example initializer 215, the example range renderer 220, the example sampler 305, the example quantizer 310, the example signal measurer 315, the example laser off parameter measurer 320, the example laser on parameter measurer 325, the example signal and noise power estimator 330, the example lookup table 335, the example sampler 405, the example quantizer 410, the example template generator 415, the example cross-correlator 420 and/or the example delay selector 425 may alternatively be used. For example, with reference to the flowcharts illustrated in FIGS. 5-7, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-7 may be implemented using coded instructions (e.g., computer and/or machine readable instructions) stored on one or more non-transitory computer and/or machine readable media such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Also, as used herein, the terms "computer readable" and "machine readable" are considered equivalent unless indicated otherwise.

An example program 500 that may be executed to implement the example range estimator 150 is illustrated in FIG. 5. With reference to the preceding figures and correspond written descriptions, execution of the example program 500 begins at block 505 at which the example second signal processor 210 of the range estimator 150 performs the second signal processing described above to estimate the propagation delays associated with received data output from the light capturing device 102 of the LIDAR system 101 while the light projector unit 104 of the LIDAR system 101 projects a modulated light beam at different scan positions to illuminate a target object, such as the object 142. Example computer readable instructions that may be executed to implement the second signal processing at block 505 are illustrated in FIG. 6, which is described in further detail below.

In the illustrated example of FIG. 5, in parallel with the processing at block 505, at block 510 the example first signal processor 205 of the range estimator 150 performs the first signal processing described above to estimate the signal and noise power parameters of the LIDAR system 101. As described above, the signal and noise power parameters are used by the second signal processor 210 to perform the second signal processing at block 505. Example computer readable instructions that may be executed to implement the first signal processing at block 510 are illustrated in FIG. 7, which is described in further detail below.

In the illustrated example, at block 515, the example range renderer 220 of the range estimator 150 converts, as described above, the estimated propagation delays determined by the second signal processing performed at block 505 to range estimates to the target object at the different scan positions at which the modulated light beam is projected. In some examples, at block 520, the range renderer 220 renders the range estimates determined at block 515 as a 3-D image of the target object. If operation of the LIDAR system 101 is to continue (block 525), execution returns to blocks 505, 510 and blocks subsequent thereto. Otherwise, execution of the example program 500 ends.

An example program P505 that may be executed to implement the example second signal processor 210 of the example range estimator 150 to perform the processing at block 505 of FIG. 5 is illustrated in FIG. 6. Execution of the example program P505 begins at block 605 at which the example template generator 415 of the second signal processor 210 accesses low resolution (e.g., 1-bit resolution), high sample rate received data output from the light capturing device 102 of the LIDAR system 101 while the LIDAR system 101 is projecting a modulated light beam at a particular scan position to illuminate a target object, such as the target object 142. For example, the low resolution, high sample rate received data may be sampled and quantized by the example sampler 405 and the example quantizer 410, as described above. At block 610, the template generator 415 accesses the signal and noise power parameters, such as the signal power a and the noise power $\sigma^2$ of the LIDAR system 101, estimated by the first signal processor 205, as described above. At block 615, the template generator 415 generates templates, which are based on the signal and noise power parameters accessed at block 610, that correspond to different possible propagation delays associated with the received data, as described above. At block 620, the example cross-correlator 420 of the second signal processor 210 cross-correlates, as described above, the templates generated at block 515 with the received data to determine an estimated propagation delay associated with the received data. As described above, the estimated propagation delay can be converted (e.g., by the range renderer 220) to a corresponding estimated range to the target object or, more specifically, to an estimate range to a portion of the target object that was illuminated by the projected, modulated light beam at the given scan position. Execution of the example program P505 then ends.

An example program P510 that may be executed to implement the example first signal processor 205 of the example range estimator 150 to perform the processing at block 510 of FIG. 5 is illustrated in FIG. 7. Execution of the example program P510 begins at block 705 at which the example signal measurer 315 of the first signal processor 205 accesses (e.g., and filters, etc.) high resolution, low sample rate received data output from the light capturing device 102 of the LIDAR system 101 while the LIDAR system 101 is and is not projecting a modulated light to illuminate a target object, such as the target object 142. For example, the high resolution, low sample rate received data may be sampled and quantized by the example sampler 305 and the example quantizer 310, as described above. At block 710, the example laser off parameter measurer 320 of the first signal processor 205 determines, as described above, a noise-only measurement $M_0$ based on a portion of the high resolution, low sample rate received data corresponding to when the modulated light beam was off. At block 715, the example laser on parameter measurer 325 of the first signal processor 205 determines, as described above, a signal-and-noise measurement $M_1$ based on a portion of the high resolution, low sample rate received data corresponding to when the modulated light beam was on. At block 720, the example signal and noise power estimator 330 of the first signal processor 205 estimates, as described above, the noise parameter σ of the LIDAR system 101 for the current scan position based on the noise-only measurement $M_O$ determined at block 710. At block 725, the example signal and noise power estimator 330 estimates, as described above, the signal parameter a of the LIDAR system 101 for the current scan line based on the noise parameter σ estimated at block 720 and the signal-and-noise measurement $M_1$ determined at block 715. Execution of the example program P510 then ends.

FIG. 8 is a block diagram of an example processor platform 800 structured to execute the instructions of FIGS. 5-7 to implement the example range estimator 150 of FIGS. 1-4. The processor platform 800 can be, for example, a server, a personal computer, a mobile device (e.g., a cell phone, a smart phone, a tablet such as an iPad™), etc., or any other type of computing device.

The processor platform 800 of the illustrated example includes a processor 812. The processor 812 of the illustrated example is hardware. For example, the processor 812 can be implemented by one or more integrated circuits, logic circuits, processing cores, microprocessors or controllers from any desired family or manufacturer. The hardware processor 812 may be a semiconductor based (e.g., silicon based) device. In this example, the processor 812 implements the example range estimator 150, the example first signal processor 205, the example second signal processor 210, the example initializer 215, the example range renderer 220, the example sampler 305, the example quantizer 310, the example signal measurer 315, the example laser off parameter measurer 320, the example laser on parameter measurer 325, the example signal and noise power estimator 330, the example lookup table 335, the example sampler 405, the example quantizer 410, the example template generator 415, the example cross-correlator 420 and/or the example delay selector 425.

The processor 812 of the illustrated example includes a local memory 813 (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 800, can allow the user to control the computer system and provide data to the computer using physical gestures, such as, but not limited to, hand or body movements, facial expressions, and face recognition. In some examples, the input data device(s) 822 implement the light capturing device 102 of the LIDAR system 101.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor. In some examples, the output devices 824 implement the light projector unit 104 of the LIDAR system 101.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID (redundant array of independent disks) systems, and digital versatile disk (DVD) drives. In some examples, the mass storage device(s) 828 provide storage for the example lookup table 335. Additionally or alternatively, in some examples the volatile memory 814 provides storage for the example lookup table 335.

Coded instructions 832 corresponding to the instructions of FIGS. 5-7 may be stored in the mass storage device 828, in the volatile memory 814, in the non-volatile memory 816, in the local memory 813 and/or on a removable tangible computer readable storage medium, such as a CD or DVD 836.

The foregoing disclosure provides examples of maximum likelihood range estimation for LIDAR systems. The following further examples, which include subject matter such as a range estimation apparatus to perform range estimation for a LIDAR system, at least one computer-readable storage medium including instructions that, when executed by at least one processor, cause the at least one processor to perform range estimation for a LIDAR system, means for performing perform range estimation for a LIDAR system, and a method to perform range estimation for a LIDAR system, are disclosed herein. The disclosed examples can be implemented individually and/or in one or more combinations.

Example 1 is a range estimation apparatus including a first signal processor to process first data output from a light capturing device of a light detecting and ranging (LIDAR) system to estimate signal and noise power parameters of the LIDAR system. The range estimation apparatus of example 1 also includes a second signal processor to generate templates corresponding to different possible propagation delays associated with second data output from the light capturing device while a modulated light beam is projected by the LIDAR system, the templates to be generated based on the signal and noise power parameters, the second data having a higher sampling rate and a lower quantization resolution than the first data. The second signal processor of example 1 is also to cross-correlate the templates with the second data to determine an estimated propagation delay associated with the second data, the estimated propagation delay convertible to an estimated range to an object that reflected the modulated light beam.

Example 2 includes the subject matter of example 1, and further includes a range renderer to convert the estimated propagation delay to the estimated range to the object, and render the estimated range as a pixel value of a three-dimensional image of the object, the pixel value corresponding to a scan position of the modulated light beam when the second data was output from the light capturing device.

Example 3 includes the subject matter of example 1 or example 2, wherein the second data is binary quantized to have one-bit resolution.

Example 4 includes the subject matter of any one of examples 1 to 3, wherein to generate a first one of the templates corresponding to a first one of the possible propagation delays, the second signal processor is to: (1) determine input values corresponding to respective samples of the second data, the input values being determined based on the samples of the second data, the first one of the possible propagation delays and the signal and noise power parameters; (2) evaluate a cumulative distribution function based on the input values to determine probability values corresponding to the respective samples of the second data; and (3) determine the first one of the templates based on the probability values.

Example 5 includes the subject matter of example 4, wherein the second signal processor is to determine the first one of the templates based on ratios of the probability values.

Example 6 includes the subject matter of any one of examples 1 to 3, wherein to estimate the signal and noise power parameters, the first signal processor is to: (1) determine a first measurement based on a first portion of the first data output from the light capturing device while the modulated light beam was off; (2) determine a second measurement based on a second portion of the first data output from the light capturing device while the modulated light beam was on; (3) estimate the noise power parameter based on the first measurement; and (4) estimate the signal power parameter based on the second measurement and the noise power parameter.

Example 7 includes the subject matter of example 6, wherein the second signal processor is further to determine respective estimated propagation delays corresponding to respective output data from the light capturing device obtained when the modulated light beam is projected at respective different scan positions corresponding to a scan pattern, and the first signal processor is further to determine respective estimated noise power parameters corresponding to the respective different scan positions, and determine respective estimated signal power parameters corresponding to respective scan lines of the scan pattern.

Example 8 corresponds to one or more non-transitory computer readable storage media including computer readable instructions which, when executed, cause one or more processors to at least: (1) process first data output from a light capturing device of a light detecting and ranging (LIDAR) system to estimate signal and noise power parameters of the LIDAR system; (2) generate templates corresponding to different possible propagation delays associated with second data output from the light capturing device while a modulated light beam is projected by the LIDAR system, the templates to be generated based on the signal and noise power parameters, the second data having a higher sampling rate and a lower quantization resolution than the first data; (3) cross-correlate the templates with the second data to determine an estimated propagation delay associated with the second data; and (4) convert the estimated propagation delay to an estimated range to an object that reflected the modulated light beam.

Example 9 includes the subject matter of example 8, wherein the instructions, when executed, further cause the one or more processors to render the estimated range as a pixel value of a three-dimensional image of the object, the pixel value corresponding to a scan position of the modulated light beam when the second data was output from the light capturing device.

Example 10 includes the subject matter of example 8 or example 9, wherein the second data is binary quantized to have one-bit resolution.

Example 11 includes the subject matter of any one of examples 8 to 10, wherein to generate a first one of the templates corresponding to a first one of the possible propagation delays, the instructions, when executed, cause the one or more processors to: (1) determine input values corresponding to respective samples of the second data, the input values being determined based on the samples of the second data, the first one of the possible propagation delays and the signal and noise power parameters; (2) evaluate a cumulative distribution function based on the input values to determine probability values corresponding to the respective samples of the second data; and (3) determine the first one of the templates based on the probability values.

Example 12 includes the subject matter of example 11, wherein the instructions, when executed, cause the one or more processors to determine the first one of the templates based on ratios of the probability values.

Example 13 includes the subject matter of any one of examples 8 to 10, wherein to estimate the signal and noise power parameters, the instructions, when executed, cause the one or more processors to: (1) determine a first measurement based on a first portion of the first data output from the light capturing device while the modulated light beam was off; (2) determine a second measurement based on a second portion of the first data output from the light capturing device while the modulated light beam was on; (3) estimate the noise power parameter based on the first measurement; and (4) estimate the signal power parameter based on the second measurement and the noise power parameter.

Example 14 includes the subject matter of example 13, wherein the instructions, when executed, further cause the one or more processors to: (1) determine respective estimated propagation delays corresponding to respective output data from the light capturing device obtained when the modulated light beam is projected at respective different scan positions corresponding to a scan pattern; (2) determine respective estimated noise power parameters corresponding to the respective different scan positions; and (3) determine respective estimated signal power parameters corresponding to respective scan lines of the scan pattern.

Example 15 is a range estimator for a light detecting and ranging (LIDAR) system. The range estimator of example 15 includes first means for processing first data output from a light capturing device of the LIDAR system to estimate signal and noise power parameters of the LIDAR system. The range estimator of example 15 also includes second means for: (1) generating templates corresponding to different possible propagation delays associated with second data output from the light capturing device while a modulated light beam is projected by the LIDAR system, the templates to be generated based on the signal and noise power parameters, the second data having a higher sampling rate and a lower quantization resolution than the first data; and (2) cross-correlating the templates with the second data to determine an estimated propagation delay associated with the second data, the estimated propagation delay convertible to an estimated range to an object that reflected the modulated light beam.

Example 16 includes the subject matter of example 15, and further includes means for converting the estimated propagation delay to the estimated range to the object, and rendering the estimated range as a pixel value of a three-dimensional image of the object, the pixel value corresponding to a scan position of the modulated light beam when the second data was output from the light capturing device.

Example 17 includes the subject matter of example 15 or example 16, wherein the second data is binary quantized to have one-bit resolution.

Example 18 includes the subject matter of any one of examples 15 to 17, wherein to generate a first one of the templates corresponding to a first one of the possible propagation delays, the second means is to: (1) determine input values corresponding to respective samples of the second data, the input values being determined based on the samples of the second data, the first one of the possible propagation delays and the signal and noise power parameters; (2) evaluate a cumulative distribution function based on the input values to determine probability values corresponding to the respective samples of the second data; and (3) determine the first one of the templates based on ratios of the probability values.

Example 19 includes the subject matter of any one of examples 15 to 17, wherein to estimate the signal and noise power parameters, the first means is to: (1) determine a first measurement based on a first portion of the first data output from the light capturing device while the modulated light beam was off; (2) determine a second measurement based on a second portion of the first data output from the light capturing device while the modulated light beam was on; (3) estimate the noise power parameter based on the first measurement; and (4) estimate the signal power parameter based on the second measurement and the noise power parameter.

Example 20 is a range estimation method for a light detecting and ranging (LIDAR) system. The method of example 20 includes processing, by executing an instruction with at least one processor, first data output from a light capturing device of the LIDAR system to estimate signal and noise power parameters of the LIDAR system. The method of example 20 also includes generating, by executing an instruction with the at least one processor, templates corresponding to different possible propagation delays associated with second data output from the light capturing device while a modulated light beam is projected by the LIDAR system, the templates to be generated based on the signal and noise power parameters, the second data having a higher sampling rate and a lower quantization resolution than the first data. The method of example 20 further includes cross-correlating, by executing an instruction with the at least one processor, the templates with the second data to determine an estimated propagation delay associated with the second data. In some examples, the method of example 20 also includes converting, by executing an instruction with the at least one processor, the estimated propagation delay to an estimated range to an object that reflected the modulated light beam.

Example 21 includes the subject matter of example 20, wherein the second data is binary quantized to have one-bit resolution.

Example 22 includes the subject matter of example 20 or example 21, wherein the generating of the templates includes generating a first one of the templates corresponding to a first one of the possible propagation delays by: (1) determining input values corresponding to respective samples of the second data, the input values being determined based on the samples of the second data, the first one of the possible propagation delays and the signal and noise power parameters; (2) evaluating a cumulative distribution function based on the input values to determine probability values corresponding to the respective samples of the second data; and (3) determining the first one of the templates based on the probability values.

Example 23 includes the subject matter of example 22, wherein the determining of the first one of the templates based on the probability values includes determining the first one of the templates based on ratios of the probability values.

Example 24 includes the subject matter of example 20 or example 21, wherein the processing of the first data includes: (1) determining a first measurement based on a first portion of the first data output from the light capturing device while the modulated light beam was off; (2) determining a second measurement based on a second portion of the first data output from the light capturing device while the modulated light beam was on; (3) estimating the noise power parameter based on the first measurement; and (4) estimating the signal power parameter based on the second measurement and the noise power parameter.

Example 25 includes the subject matter of example 24, and further includes: (1) determining respective estimated propagation delays corresponding to respective output data from the light capturing device obtained when the modulated light beam is projected at respective different scan positions corresponding to a scan pattern; (2) determining respective estimated noise parameters corresponding to the respective different scan positions; and (3) determining respective estimated signal parameters corresponding to respective scan lines of the scan pattern.

Example 26 corresponds to one more computer readable storage media including computer readable instructions which, when executed, cause one or more processors to perform the method of any one of examples 20 to 25.

Example 27 is an apparatus including one or more processors to perform the method of any one of examples 20 to 25.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A range estimation apparatus comprising:
    a first signal processor to estimate a signal power parameter and a noise power parameter of a light detecting and ranging (LIDAR) system based on first data to be output from a light capturing device of the LIDAR system; and
    a second signal processor to:
        generate templates corresponding to different possible propagation delays associated with second data to be output from the light capturing device, the second data associated with a modulated light beam projected by the LIDAR system, the templates to be generated based on the signal power parameter and the noise power parameter, the second data to have a higher sampling rate and a lower quantization resolution than the first data; and determine, based on the templates, an estimated propagation delay associated with the second data.

2. The apparatus of claim 1, further including a range renderer to:

convert the estimated propagation delay to an estimated range to an object that reflected the modulated light beam; and render the estimated range as a pixel value of a three-dimensional image of the object, the pixel value corresponding to a scan position of the modulated light beam associated with the second data.

3. The apparatus of claim 1, wherein the second data is binary quantized to have one-bit resolution.

4. The apparatus of claim 1, wherein the templates generated by the second signal processor include a first one of the templates corresponding to a first one of the possible propagation delays, and the second signal processor is to:

determine input values corresponding to respective samples of the second data, the input values to be determined based on the samples of the second data, the first one of the possible propagation delays and the signal and noise power parameters;

evaluate a cumulative distribution function based on the input values to determine probability values corresponding to the respective samples of the second data; and determine the first one of the templates based on the probability values.

5. The apparatus of claim 4, wherein the second signal processor is to determine the first one of the templates based on ratios of the probability values.

6. The apparatus of claim 1, wherein, to estimate the signal power parameter and the noise power parameter, the first signal processor is to:

determine a first measurement based on a first portion of the first data, the first portion to be output from the light capturing device while the modulated light beam is off;

determine a second measurement based on a second portion of the first data, the second portion to be output from the light capturing device while the modulated light beam is on;

estimate the noise power parameter based on the first measurement; and estimate the signal power parameter based on the second measurement and the noise power parameter.

7. The apparatus of claim 6, wherein the second signal processor is to determine respective estimated propagation delays corresponding to respective output data from the light capturing device, the respective output data to be obtained when the modulated light beam is projected at respective different scan positions corresponding to a scan pattern, and the first signal processor is to:

determine respective estimated noise power parameters corresponding to the respective different scan positions; and determine respective estimated signal power parameters corresponding to respective scan lines of the scan pattern.

8. The apparatus of claim 1, wherein the second signal processor is to cross-correlate the second data with the templates to determine the estimated propagation delay associated with the second data.

9. At least one non-transitory computer readable medium comprising computer readable instructions which, when executed, cause one or more processors to at least:

estimate a signal power parameter and a noise power parameter of a light detecting and ranging (LIDAR) system based on first data to be output from a light capturing device of the LIDAR system;

generate templates corresponding to different possible propagation delays associated with second data to be output from the light capturing device, the second data associated with a modulated light beam projected by the LIDAR system, the templates to be generated based on the signal power parameter and the noise power parameter, the second data to have a higher sampling rate and a lower quantization resolution than the first data; and determine, based on the second data and the templates, an estimated range to an object that reflected the modulated light beam.

10. The at least one non-transitory computer readable medium of claim 9, wherein the instructions, when executed, cause the one or more processors to render the estimated range as a pixel value of a three-dimensional image of the object, the pixel value corresponding to a scan position of the modulated light beam associated with the second data.

11. The least one non-transitory computer readable medium of claim 9, wherein the second data is binary quantized to have one-bit resolution.

12. The least one non-transitory computer readable medium of claim 9, wherein the templates include a first one of the templates corresponding to a first one of the possible propagation delays, and the instructions cause the one or more processors to:

determine input values corresponding to respective samples of the second data, the input values to be determined based on the samples of the second data, the first one of the possible propagation delays and the signal and noise power parameters;

evaluate a cumulative distribution function based on the input values to determine probability values corresponding to the respective samples of the second data; and determine the first one of the templates based on the probability values.

13. The least one non-transitory computer readable medium of claim 12, wherein the instructions cause the one or more processors to determine the first one of the templates based on ratios of the probability values.

14. The least one non-transitory computer readable medium of claim 9, wherein, to estimate the signal power parameter and the noise power parameter, the instructions cause the one or more processors to:

determine a first measurement based on a first portion of the first data, the first portion to be output from the light capturing device while the modulated light beam is off;

determine a second measurement based on a second portion of the first data, the second portion to be output from the light capturing device while the modulated light beam was on;

estimate the noise power parameter based on the first measurement; and estimate the signal power parameter based on the second measurement and the noise power parameter.

15. The least one non-transitory computer readable medium of claim 14, wherein the instructions cause the one or more processors to:

determine respective estimated propagation delays corresponding to respective output data from the light capturing device, the respective output data to be obtained when the modulated light beam is projected at respective different scan positions corresponding to a scan pattern;

determine respective estimated noise power parameters corresponding to the respective different scan positions; and determine respective estimated signal power parameters corresponding to respective scan lines of the scan pattern.

16. The least one non-transitory computer readable medium of claim 9, wherein the instructions cause the one or more processors to:

cross-correlate the templates with the second data to determine an estimated propagation delay associated with the second data; and convert the estimated propagation delay to the estimated range to the object.

17. A range estimation method for a light detecting and ranging (LIDAR) system, the method comprising:

estimating a signal power parameter and a noise power parameter of the LIDAR system based on first data being output from a light capturing device of the LIDAR system;

generating, by executing an instruction with at least one processor, templates corresponding to different possible propagation delays associated with second data being output from the light capturing device, the second data associated with a modulated light beam projected by the LIDAR system, the templates generated based on the signal power parameter and the noise power parameter, the second data having a higher sampling rate and a lower quantization resolution than the first data; and determining an estimated range to an object that reflected the modulated light beam, the estimated range based on the second data and the templates.

18. The method of claim 17, wherein the second data is binary quantized to have one-bit resolution.

19. The method of claim 17, wherein the generating of the templates includes generating a first one of the templates corresponding to a first one of the possible propagation delays by:

determining input values corresponding to respective samples of the second data, the input values being determined based on the samples of the second data, the first one of the possible propagation delays and the signal and noise power parameters;

evaluating a cumulative distribution function based on the input values to determine probability values corresponding to the respective samples of the second data; and determining the first one of the templates based on the probability values.

20. The method of claim 17, wherein the determining of the estimated range to the object includes:

cross-correlating the templates with the second data to determine an estimated propagation delay associated with the second data; and converting the estimated propagation delay to the estimated range to the object.

* * * * *